US010844923B2

(12) United States Patent
Inoue et al.

(10) Patent No.: US 10,844,923 B2
(45) Date of Patent: Nov. 24, 2020

(54) MOUNT FOR SUBFRAME AND MAGNETORHEOLOGICAL ELASTOMER UNIT

(71) Applicant: HONDA MOTOR CO., LTD., Tokyo (JP)

(72) Inventors: Toshio Inoue, Wako (JP); Yuho Ito, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 75 days.

(21) Appl. No.: 16/191,930

(22) Filed: Nov. 15, 2018

(65) Prior Publication Data
US 2019/0154098 A1 May 23, 2019

(30) Foreign Application Priority Data
Nov. 17, 2017 (JP) .................................. 2017-221674

(51) Int. Cl.
*F16F 1/36* (2006.01)
*F16F 7/10* (2006.01)

(52) U.S. Cl.
CPC ............ *F16F 7/1011* (2013.01); *F16F 1/361* (2013.01); *F16F 2222/06* (2013.01); *F16F 2228/066* (2013.01); *F16F 2230/18* (2013.01); *F16F 2234/02* (2013.01)

(58) Field of Classification Search
CPC ...... F16F 1/361; F16F 7/1011; F16F 2222/06; F16F 2228/066; F16F 2230/18; F16F 2234/02
USPC ........................................ 267/140.14, 140.15
See application file for complete search history.

(56) References Cited

U.S. PATENT DOCUMENTS

| 5,814,999 | A | * | 9/1998 | Elie | ......................... | B60G 7/006 |
| | | | | | | 324/662 |
| 5,816,587 | A | * | 10/1998 | Stewart | ................... | B60G 7/006 |
| | | | | | | 280/5.516 |
| 7,086,507 | B2 | * | 8/2006 | Hitchcock | ............... | F16F 1/361 |
| | | | | | | 188/267.2 |
| 8,844,914 | B2 | * | 9/2014 | Kim | ......................... | F16F 1/361 |
| | | | | | | 188/267.2 |
| 9,616,727 | B2 | * | 4/2017 | Ogawa | ................. | B60G 13/003 |
| 9,835,218 | B2 | * | 12/2017 | Inoue | ..................... | F16F 7/1011 |

(Continued)

FOREIGN PATENT DOCUMENTS

| JP | 6047087 B2 | 12/2016 |
| WO | 2016/148011 A1 | 9/2016 |

OTHER PUBLICATIONS

Office Action including search report dated Jun. 24, 2020 issued over the corresponding Chinese Patent Application No. 201811365687.3 with the English translation thereof.

(Continued)

*Primary Examiner* — Thomas W Irvin
(74) *Attorney, Agent, or Firm* — Carrier Blackman & Associates, P.C.; Joseph P. Carrier; William D. Blackman

(57) ABSTRACT

When forces are input to a mount in a plurality of directions, an ECU changes the magnitude of a coil excitation current to change the strength of a magnetic field. At this moment, the elastic force of the mount can be changed in directions in response to the plurality of directions in which the forces are input using a plurality of magnetorheological elastomers (a brim-shaped MRE portion and a cylindrical MRE portion) in which magnetic particles are arranged in different manners.

4 Claims, 10 Drawing Sheets

(56) References Cited

U.S. PATENT DOCUMENTS

| | | | |
|---|---|---|---|
| 10,161,467 B2* | 12/2018 | Terashima | F16F 1/361 |
| 10,267,373 B2* | 4/2019 | Inoue | F16F 7/1011 |
| 10,352,393 B2* | 7/2019 | Inoue | F16F 1/361 |
| 10,381,143 B2* | 8/2019 | Khoshkava | H01F 27/2823 |
| 10,400,841 B2* | 9/2019 | Inoue | F16F 7/1011 |
| 10,544,848 B2* | 1/2020 | Inoue | F16F 1/3615 |
| 10,570,978 B2* | 2/2020 | Rumpel | F16F 1/387 |
| 10,630,158 B2* | 4/2020 | Terashima | F16F 1/3615 |
| 2017/0219039 A1* | 8/2017 | Inoue | F16F 7/1011 |
| 2017/0363171 A1* | 12/2017 | Inoue | F16F 15/31 |
| 2018/0066723 A1 | 3/2018 | Inoue et al. | |
| 2018/0180131 A1* | 6/2018 | Inoue | F16F 1/3615 |
| 2019/0154108 A1* | 5/2019 | Inoue | F16F 15/03 |
| 2019/0170206 A1* | 6/2019 | Inoue | B62D 27/04 |
| 2019/0315219 A1* | 10/2019 | Inoue | F16F 1/3842 |

OTHER PUBLICATIONS

Liu, Xueqin, "Magnetorheological Elastomer Vibration Isolator Based on Shear-Compression Mixing Mode", "Full-Text Engineering Technology Series II of Chinese Excellent Master Degree Thesis", pp. 25-27, 35 and 45, Mar. 15, 2013 (pp. 15-19 of NPL Cite #1).

* cited by examiner

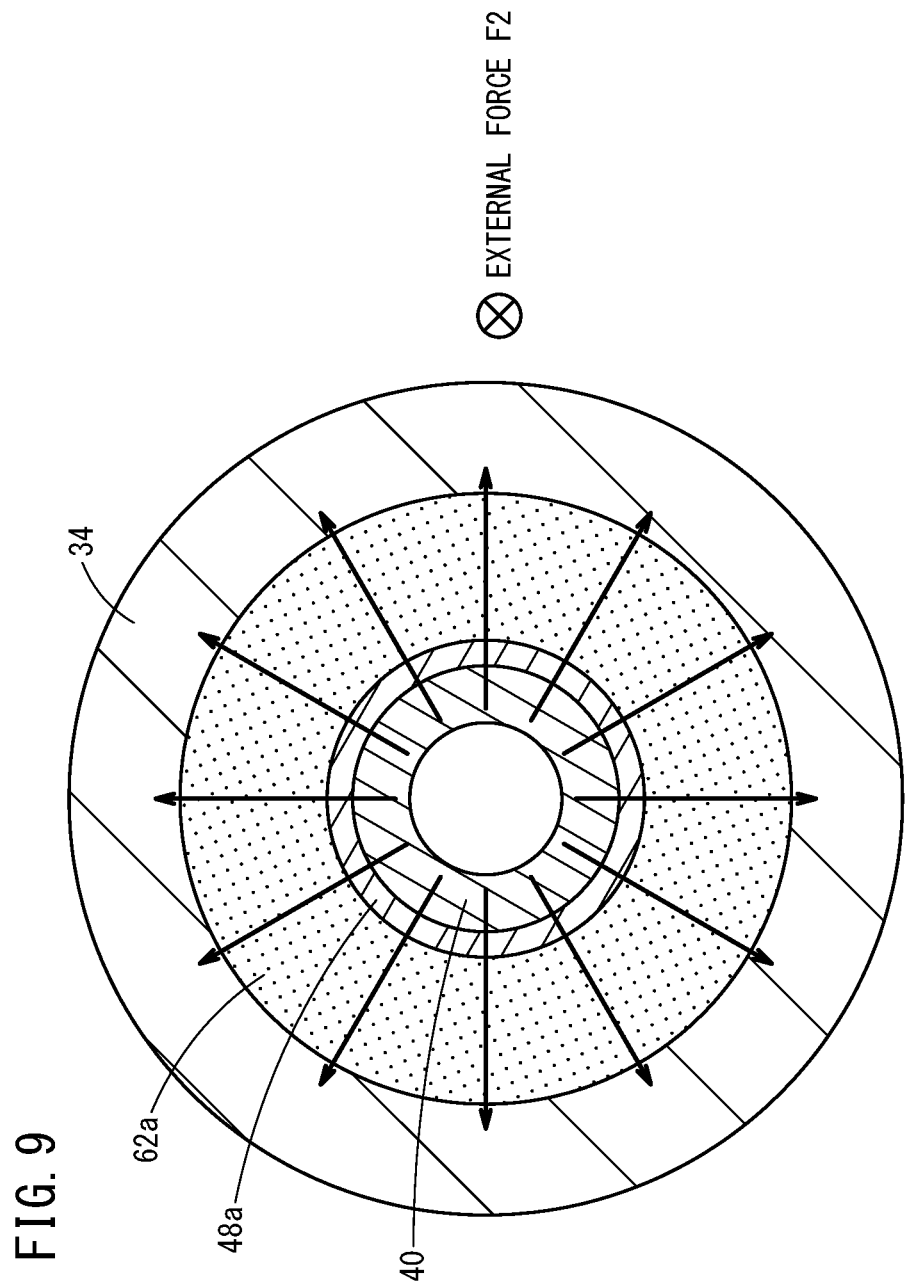

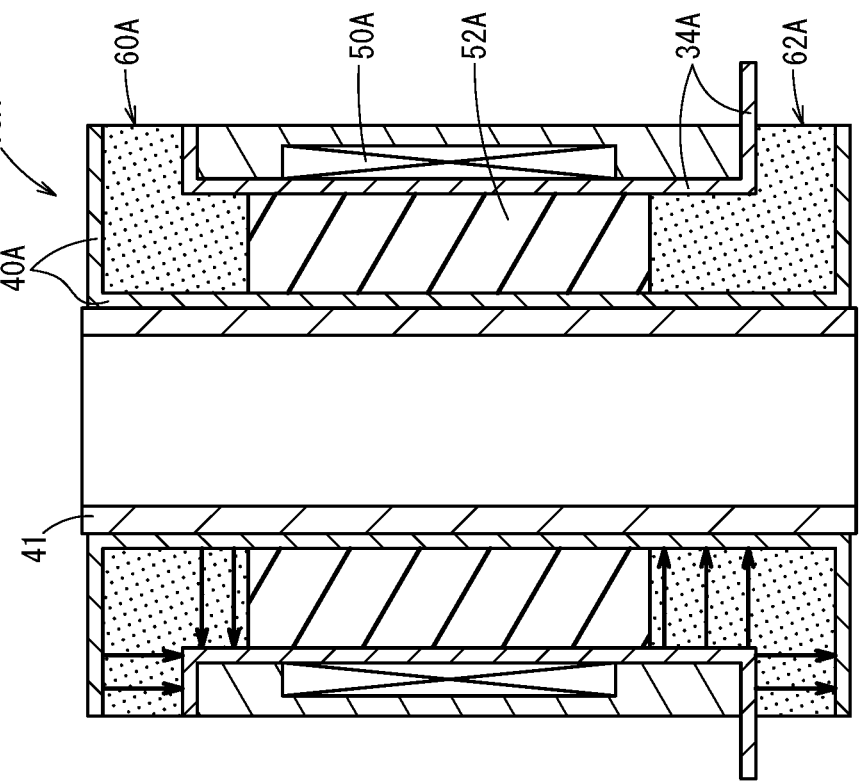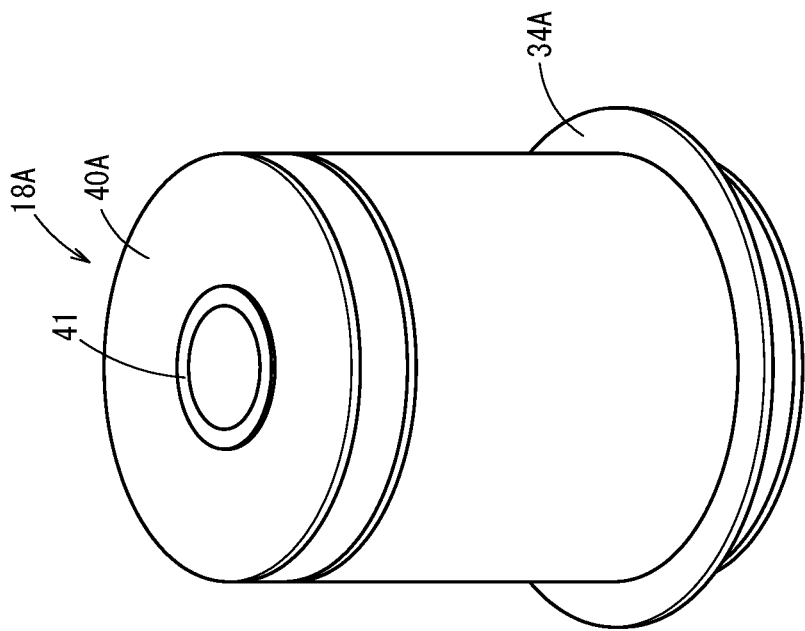

MOUNT FOR SUBFRAME AND MAGNETORHEOLOGICAL ELASTOMER UNIT

CROSS-REFERENCE TO RELATED APPLICATION

This application is based upon and claims the benefit of priority from Japanese Patent Application No. 2017-221674 filed on Nov. 17, 2017, the contents of which are incorporated herein by reference.

BACKGROUND OF THE INVENTION

Field of the Invention

The present invention relates to mounts for subframes of vehicles disposed on the subframes at positions where the subframes are supported by vehicle bodies (main frames), and magnetorheological elastomer (MRE).

Description of the Related Art

For example, Japanese Patent No. 6047087 (hereinafter referred to as "JPB6047087") discloses mounts using magnetorheological elastomer and disposed on a subframe on which a driving source of a vehicle is mounted ([0024], [0025], and FIG. 2 in JPB6047087).

JPB6047087 discloses a technique to improve turning performance of the vehicle by increasing the modulus of elasticity of the magnetorheological elastomer during turning, more specifically, when the difference in torque on left and right wheels is large, to increase the stiffness (yaw stiffness) of the mounts ([0009] in JPB6047087).

International Publication No. WO 2016/148011 describes directions in which the stiffness of magnetorheological elastomer is changed by a magnetic field ([0028] to [0031] in International Publication No. WO 2016/148011).

SUMMARY OF THE INVENTION

The present invention has been devised taking into consideration the aforementioned background arts, and has the object of providing a mount for a subframe, the elastic force of the mount disposed on the subframe being variable in a plurality of directions in response to forces input to the mount in the plurality of directions, and magnetorheological elastomer applicable to the mount and the like.

A mount for a subframe according to the present invention is a mount disposed on a subframe at a position where the subframe is supported by a vehicle body and includes:

an inner cylinder composed of a magnetic body having a hollow shaft portion for fastening the mount to the vehicle body;

an outer cylinder composed of a magnetic body coaxially disposed on a radially outer side of the inner cylinder;

a magnetorheological elastomer disposed between the inner cylinder and the outer cylinder; and a coil configured to apply a magnetic field to the magnetorheological elastomer to change viscoelasticity of the magnetorheological elastomer;

wherein the magnetorheological elastomer includes a plurality of the magnetorheological elastomers including magnetic particles arranged in different manners.

According to the present invention, the strength of the magnetic field is changed when forces are input to the mount in a plurality of directions. At this moment, the elastic force (resilience) of the mount can be changed in response to the plurality of directions in which the forces are input, using a plurality of magnetorheological elastomers including magnetic particles arranged in different manners.

In this case, the plurality of the magnetorheological elastomers may include at least a first magnetorheological elastomer and a second magnetorheological elastomer;

the magnetic particles in the first magnetorheological elastomer may be arranged parallel to a direction of an axis of the inner cylinder; and the magnetic particles in the second magnetorheological elastomer may be radially arranged from a central axis of the inner cylinder in directions perpendicular to the axis.

In this manner, the elastic force of the mount can be changed according to the forces input to the mount in the direction of the axis and in the directions perpendicular to the axis using the first and second magnetorheological elastomers.

Moreover, an elastic body having a cylindrical shape may be disposed between the inner cylinder and the outer cylinder. The elastic body having the cylindrical shape and the magnetorheological elastomers can form a mass (mass member) of the elastic body of the mount.

A magnetorheological elastomer unit according to the present invention includes:

a first cylindrical portion composed of a magnetorheological elastomer in which magnetic particles are arranged in a direction of an axis of the first cylindrical portion; and a second cylindrical portion having a diameter different from the diameter of the first cylindrical portion and composed of a magnetorheological elastomer in which magnetic particles are radially arranged in directions perpendicular to an axis of the second cylindrical portion;

wherein the first cylindrical portion and the second cylindrical portion are disposed on top of each other on a common hollow shaft.

According to the present invention, the single magnetorheological elastomer can change the elastic force in both the direction of the axis and in the directions perpendicular to the axis.

In addition, the magnetorheological elastomer unit according to the present invention includes:

the first cylindrical portion composed of the magnetorheological elastomer in which the magnetic particles are arranged in the direction of the axis of the first cylindrical portion; and the second cylindrical portion having a diameter smaller than the diameter of the first cylindrical portion and composed of the magnetorheological elastomer in which the magnetic particles are radially arranged in the directions perpendicular to the axis of the second cylindrical portion;

wherein the first cylindrical portion and the second cylindrical portion disposed on top of each other on the common hollow shaft form a flange shape.

According to the present invention, the first cylindrical portion and the second cylindrical portion of the single magnetorheological elastomer are disposed on top of each other on the common hollow shaft to form the flange shape. This causes the variable elastic property to be uniform in radial directions with respect to the axis, resulting in an improvement in convenience as a magnetorheological elastomer unit.

According to the present invention, using the plurality of magnetorheological elastomers including the magnetic particles arranged in different manners the strength of the magnetic field is changed when the forces are input to the mount in the plurality of directions. At this moment, the elastic force (resilience) of the mount can be changed in the directions in response to the plurality of directions in which the forces are input.

In addition, according to the present invention, the single magnetorheological elastomer can change the elastic force in both the direction of the axis and the directions perpendicular to the axis.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a schematic cross-sectional view of the mount taken along line IX-IX in FIG. 8;

FIG. 10A is a perspective view of a mount according to a modification; and

FIG. 10B is a longitudinal sectional view of the mount according to the modification.

DESCRIPTION OF THE PREFERRED EMBODIMENT

A preferred embodiment of a mount for a subframe and magnetorheological elastomer according to the present invention will be described in detail below with reference to the accompanying drawings.

[Structure]

Figure 1:
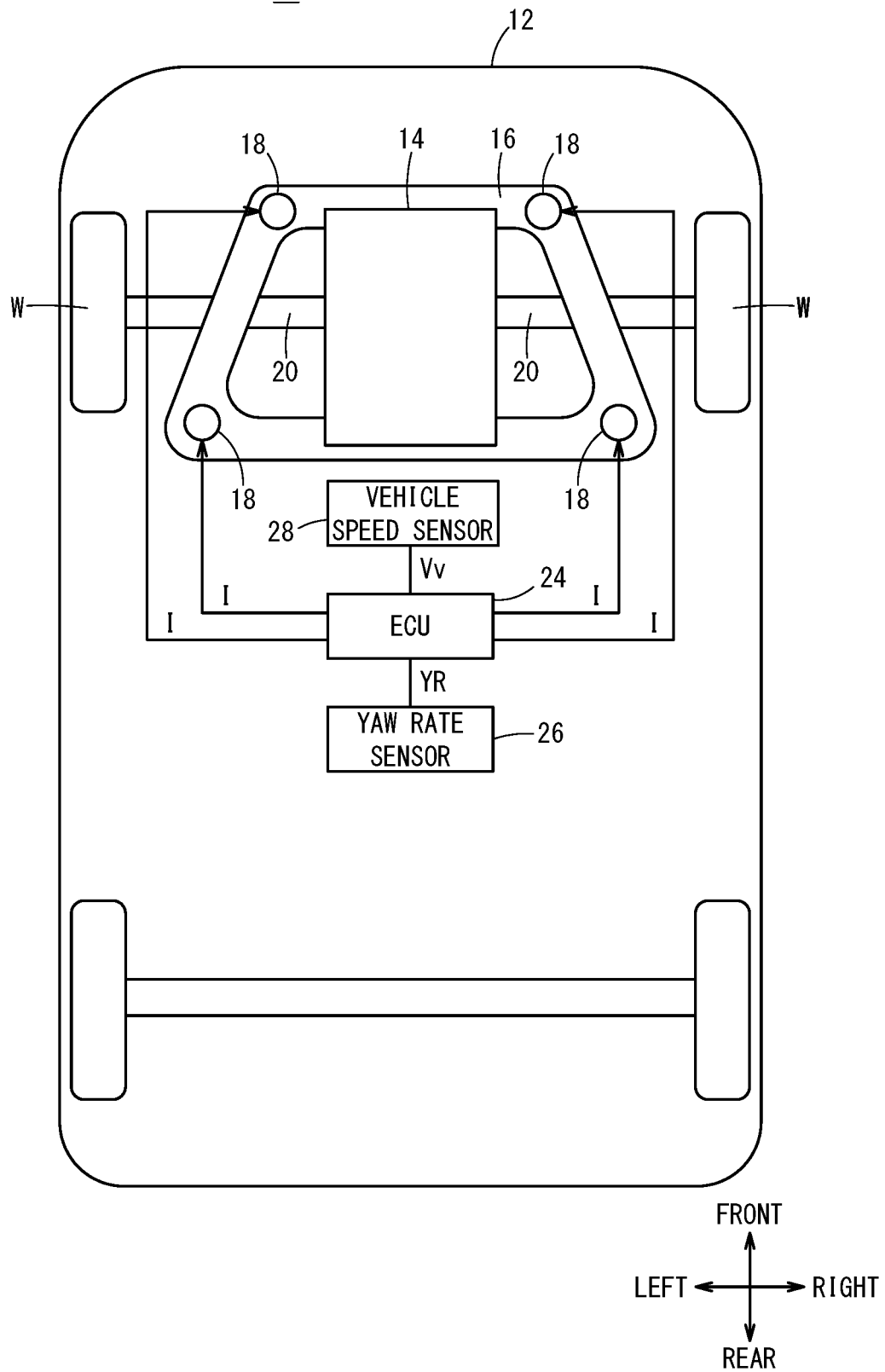
FIG. 1 is a schematic plan view of a vehicle to which a mount for a subframe and magnetorheological elastomer according to the present invention are applied.

FIG. 1 is a schematic plan view of a vehicle 10 to which a mount for a subframe and magnetorheological elastomer according to the present invention are applied.

The vehicle 10 includes an approximately rectangular subframe 16 in the front part of a vehicle body (main frame) 12. A component 14 including an internal combustion engine, an electric motor, a power generator, a differential gear, a fuel tank, and/or transmission as appropriate is mounted on the subframe 16.

The subframe 16 is provided at the four corners with mounts 18 for a subframe according to this embodiment (hereinafter also referred to as "mount") including magnetorheological elastomer according to this embodiment (hereinafter also referred to as "MRE").

The subframe 16 is joined to the vehicle body (main frame) 12 via the mounts 18.

The component 14 mounted on the subframe 16 is partially connected to front wheels W via an axle 20. The front wheels W are steered wheels and are connected and suspended on the vehicle body (main frame) 12 and the subframe 16 by a suspension device (not illustrated). The front wheels W are connected to a steering wheel (not illustrated) via a rack mechanism and a steering shaft (both not illustrated).

The mounts 18 are connected with an electronic control unit (ECU) 24 serving as a controller and provided with coil excitation currents I by the ECU 24.

The coil excitation currents I are controlled by the ECU 24 to have values according to the yaw rate YR obtained by a yaw rate sensor 26 and/or the vehicle speed Vv obtained by a vehicle speed sensor 28 such as a wheel speed sensor. The sensors are disposed adjacent to the center of gravity of the vehicle body 12.

Figure 2:
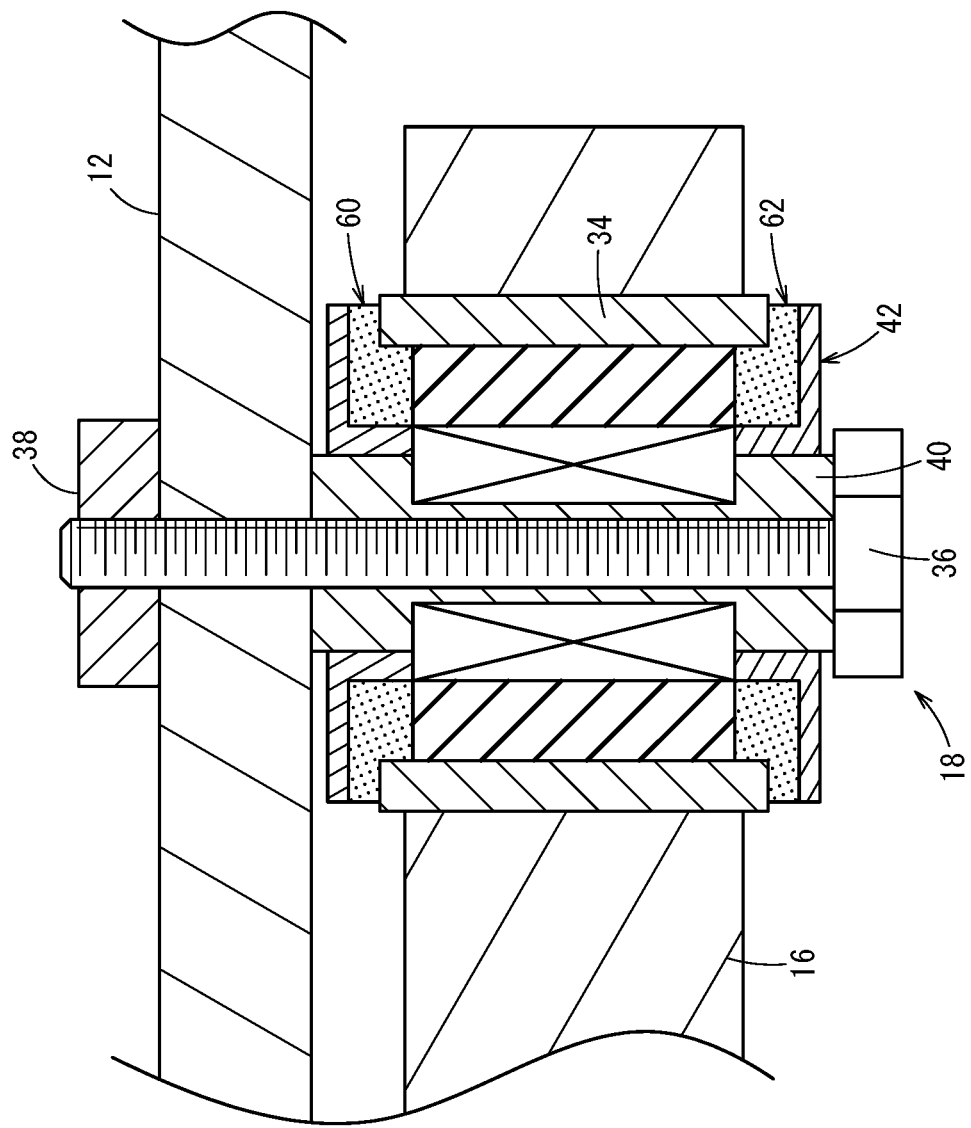
FIG. 2 is a partially omitted cross-sectional view illustrating how the mount fastened to the subframe is mounted on a vehicle body (main frame)

FIG. 2 is a partially omitted cross-sectional view illustrating how each mount 18 fastened to the subframe 16 by, for example, fitting is mounted on the vehicle body (main frame) 12.

The mount 18 includes an outer cylinder (for ease of understanding, also referred to as "outer cylindrical magnetic core") 34 composed of a magnetic body fitted in the subframe 16, an inner cylinder (for ease of understanding, also referred to as "inner cylindrical magnetic core") 40 composed of a magnetic body in which a bolt (through-bolt) 36 is inserted and fastened to the vehicle body (main frame) 12 by the bolt 36 and a nut 38, and an internal mount structure 42 disposed between the inner cylinder 40 and the outer cylinder 34. The outer cylinder 34 is coaxially disposed on the radially outer side of the inner cylinder 40.

Figure 3:
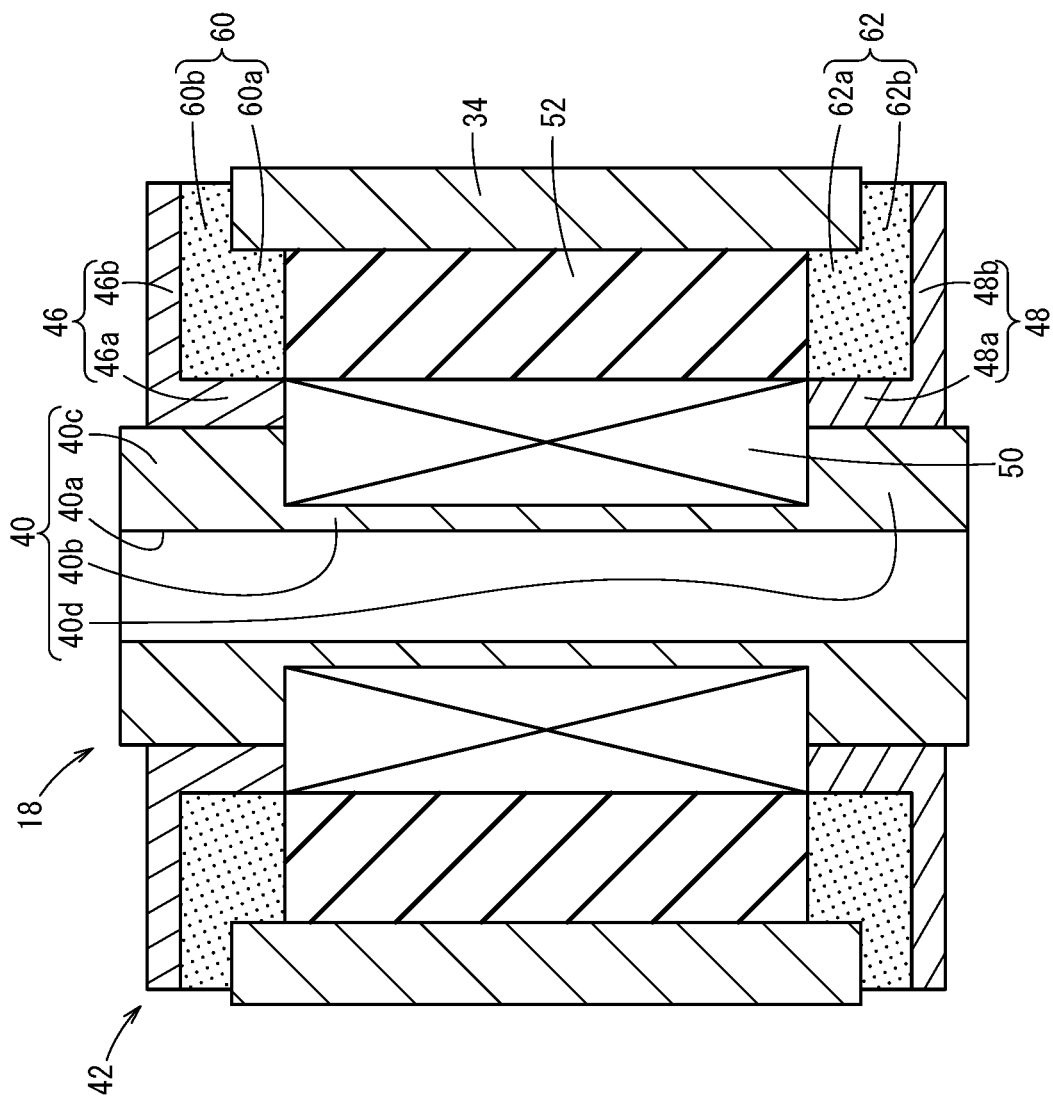
FIG. 3 is a longitudinal sectional view illustrating components of an internal mount structure of the mount alone.

FIG. 3 is an enlarged longitudinal sectional view illustrating components of the internal mount structure 42 of the mount 18 alone.

As illustrated in FIG. 3, the mount 18 includes the inner cylinder 40 composed of a substantially dumbbell-shaped magnetic body having a hollow cylindrical bolt hole 40a.

The inner cylinder 40 includes a first magnetic core (also referred to as "intermediate magnetic core") 40b having a cylindrical shape, a top magnetic core 40c having a cylindrical shape extending from an upper portion of the first magnetic core 40b outward in the circumferential direction, and a bottom magnetic core 40d having a cylindrical shape extending from a lower portion of the first magnetic core 40b outward in the circumferential direction.

An upper magnetic core 46 is composed of a flange-shaped magnetic body, and a cylindrical core portion 46a of the upper magnetic core 46 is attached to the outer circumferential wall of the top magnetic core 40c of the inner cylinder 40. A brim-shaped core portion 46b is formed around the cylindrical core portion 46a.

Similarly, a lower magnetic core 48 is composed of a flange-shaped magnetic body, and a cylindrical core portion 48a of the lower magnetic core 48 is attached to the outer circumferential wall of the bottom magnetic core 40d of the inner cylinder 40. A brim-shaped core portion 48b is formed around the cylindrical core portion 48a.

A cylindrical exciting coil 50 generating a magnetic field (magnetic flux) with a strength according to the magnitude of the coil excitation current I supplied by the ECU 24 is wound around the cylindrical sidewall of the first magnetic core 40b of the inner cylinder 40.

The upper annular surface of the exciting coil 50 is in contact with the lower annular surface of the top magnetic core 40c and the lower annular surface of the cylindrical core portion 46a.

In addition, the lower annular surface of the exciting coil 50 is in contact with the upper annular surface of the bottom magnetic core 40d and the upper annular surface of the cylindrical core portion 48a.

The outer diameter of the exciting coil 50 is substantially identical to the outer diameters of the cylindrical core portions 46a and 48a.

A cylindrical mount rubber (functioning as a mass member) 52 is coaxially attached to the exciting coil 50 on the radially outer side of the exciting coil 50. In this embodiment, the height of the mount rubber (main rubber) 52 is substantially identical to the height of the exciting coil 50.

The height of the outer cylinder 34 is larger than the height of the mount rubber 52 in the axial direction and smaller than a distance between the lower surface of the brim-shaped core portion 46b and the upper surface of the brim-shaped core portion 48b in the axial direction.

An upper MRE 60 as a flange-shaped magnetorheological elastomer is held in a flange-shaped space defined by the upper magnetic core 46, the mount rubber 52, and the outer cylinder 34. More specifically, the upper MRE 60 is held while being confined in the space defined by the upper magnetic core 46, the mount rubber 52, and the outer cylinder 34.

The upper MRE 60 includes a cylindrical MRE portion 60a and a brim-shaped MRE portion 60b constituting an upper cylinder.

Similarly, a lower MRE 62 as a flange-shaped magnetorheological elastomer is held in a flange-shaped space defined by the lower magnetic core 48, the mount rubber 52, and the outer cylinder 34. More specifically, the lower MRE 62 is held while being confined in the space defined by the lower magnetic core 48, the mount rubber 52, and the outer cylinder 34.

The lower MRE 62 includes a cylindrical MRE portion 62a and a brim-shaped MRE portion 62b constituting a lower cylinder.

The upper MRE 60 and the lower MRE 62 are members having viscoelastic properties changing according to the magnitude of the magnetic field generated by the exciting coil 50.

Specifically, the MREs 60, 62 are composed of an elastic material such as rubber to which magnetic powder, for example, iron powder, is added. The stiffnesses of the MREs 60, 62 are low when the exciting coil 50 generates no magnetic field (or a weak magnetic field), and increase according to the magnitude of the magnetic field when the exciting coil 50 generates the magnetic field.

[Method for Producing MREs 60, 62]

[First Production Method]

Next, a first method for producing the MREs (magnetorheological elastomers) 60, 62 will be described with reference to FIG. 4.

Figure 4:
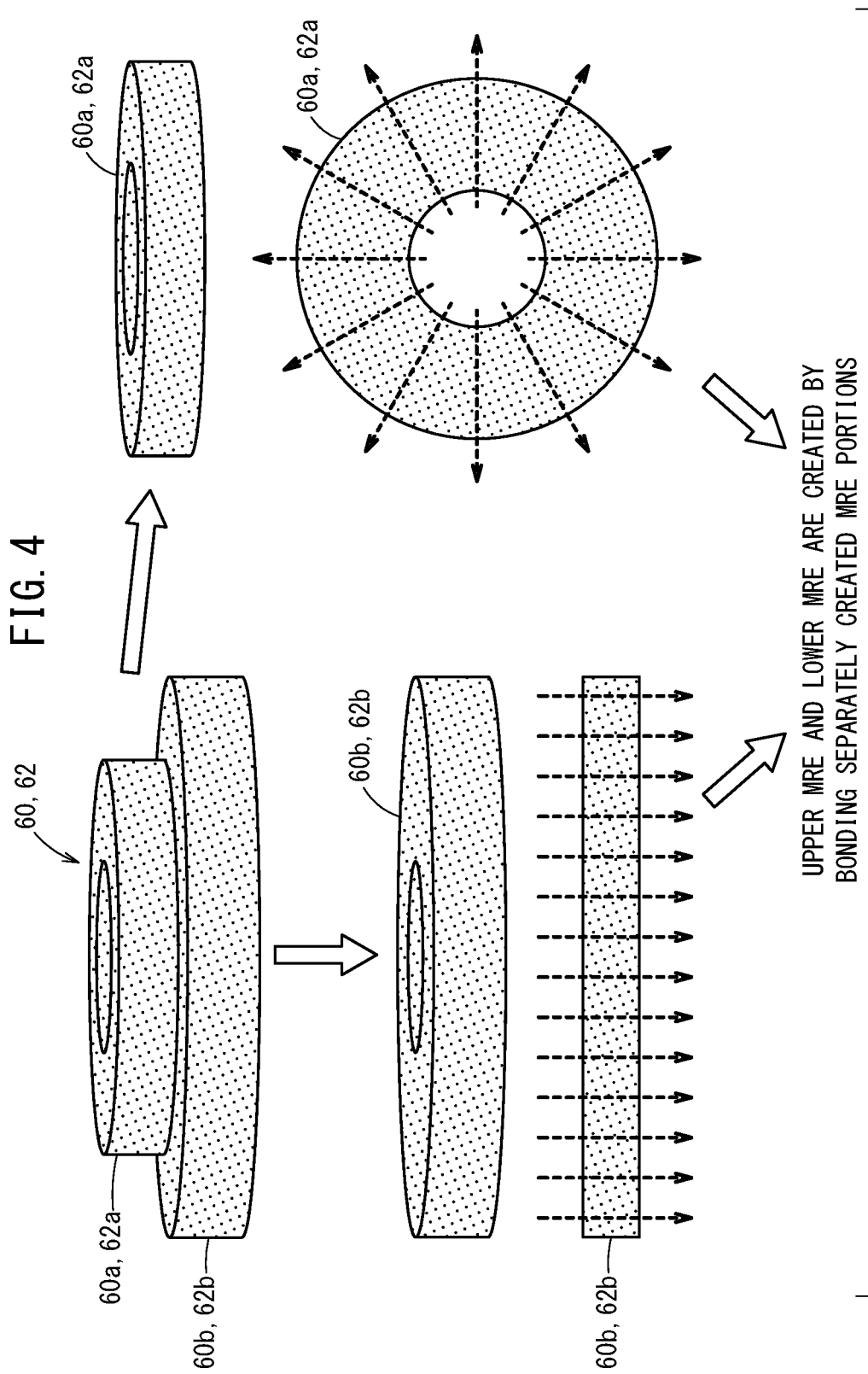
FIG. 4 is a diagram illustrating a first method of producing an upper magnetorheological elastomer and a lower magnetorheological elastomer.

As illustrated in the upper left drawing in FIG. 4, the upper MRE 60 and the lower MRE 62 in this embodiment have an identical shape for ease of production, management, and cost reduction.

More specifically, the MREs 60, 62 illustrated in the upper left drawing have a flange-like shape and respectively include the brim-shaped MRE portions 60b, 62b illustrated in the middle left drawing in FIG. 4 and the cylindrical MRE portions 60a, 62a illustrated in the upper right drawing in FIG. 4. The cylindrical MRE portions 60a, 62a have an outer diameter smaller than the outer diameter of the brim-shaped MRE portions 60b, 62b and are respectively disposed on top of the brim-shaped MRE portions 60b, 62b.

The brim-shaped MRE portions 60b, 62b are formed using a liquid material produced by mixing an elastic material such as silicone rubber and magnetic powder such as iron powder.

As illustrated in the lower left drawing in FIG. 4, during the production, the brim-shaped MRE portions 60b, 62b are cured while a strong magnetic field is applied in the vertical direction as indicated by broken line arrows such that the magnetic powder is oriented in the vertical direction.

On the other hand, the cylindrical MRE portions 60a, 62a are formed using a liquid material produced by mixing an elastic material such as silicone rubber and magnetic powder such as iron powder.

As illustrated in the lower right drawing in FIG. 4, during the production, the cylindrical MRE portions 60a, 62a are cured while a strong magnetic field is radially applied as indicated by broken line arrows such that the magnetic powder is radially oriented.

The brim-shaped MRE portions 60b, 62b and the cylindrical MRE portions 60a, 62a produced separately in the above-described manner are respectively bonded and secured to each other using an adhesive to produce (form) the upper MRE 60 and the lower MRE 62 having a flange-like shape.

[Second Production Method]

Figure 5:
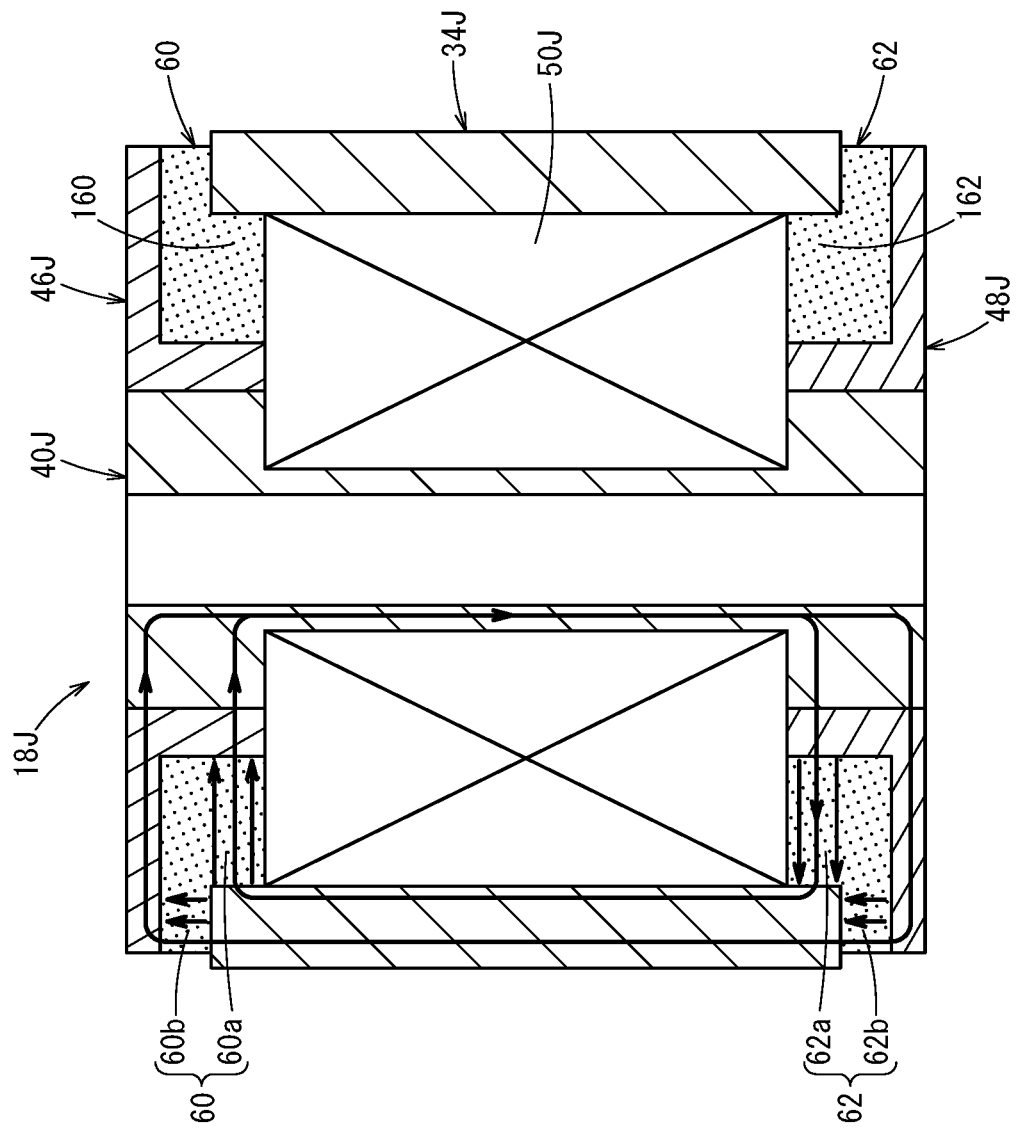
FIG. 5 is a diagram illustrating a second method of producing the upper magnetorheological elastomer and the lower magnetorheological elastomer.

Next, a second production method for producing the MREs 60, 62 will be described with reference to FIG. 5.

In the second production method, a mount production jig 18J having a shape similar to the mount 18 is built to produce the mount 18.

The mount production jig 18J includes an inner cylinder jig 40J, a flange-shaped upper magnetic core jig 46J, a flange-shaped lower magnetic core jig 48J, and an outer cylinder jig 34J all composed of magnetic bodies.

In this case, the mount production jig 18J holds a cylindrical exciting coil jig 50J, with an increased number of turns compared with the exciting coil 50 in the mount 18 illustrated in FIG. 3, between the inner cylinder jig 40J and the outer cylinder jig 34J.

A liquid material produced by mixing an elastic material such as silicone rubber and magnetic powder such as iron powder is poured and sealed in an upper flange-shaped space 160 and a lower flange-shaped space 162 in the mount production jig 18J.

A large current applied to the exciting coil jig 50J generates a magnetic field (magnetic flux) as indicated by arrows, and the liquid material cured while the magnetic field is generated produces (forms) the upper MRE 60 and the lower MRE 62.

[Effects]

Next, operational effects of the mount 18 to which the MREs 60, 62 are applied will be described by using the MREs 60, 62 as an example.

[Description of Operational Effects of MRE Structure with Basic Construction]

First, before the operational effects of the mount 18 for the subframe according to this embodiment are described, the operational effects of an MRE structure (magnetorheological elastomer structure) 100 with a basic construction will be described with reference to FIGS. 6A to 6C for ease of understanding.

Figure 6A:
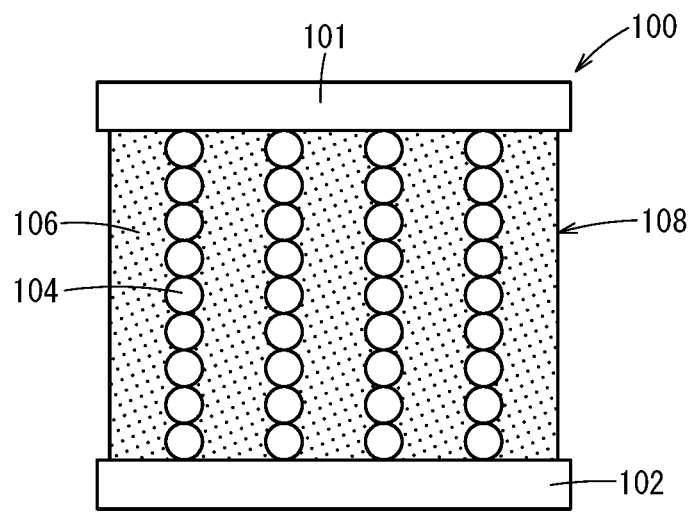
FIG. 6A is a schematic view illustrating a magnetorheological elastomer structure with a basic construction while no external force is applied in a shear direction.
Figure 6B:
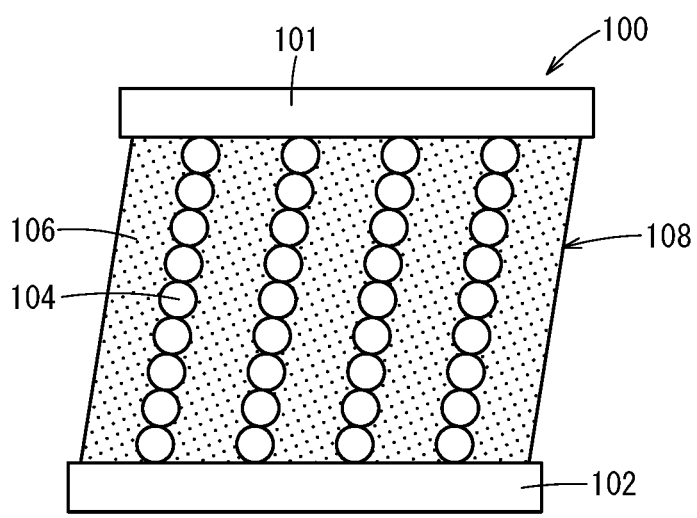
FIG. 6B is a schematic view illustrating the magnetorheological elastomer structure with the basic construction laterally bent in response to an external force applied in the shear direction.
Figure 6C:
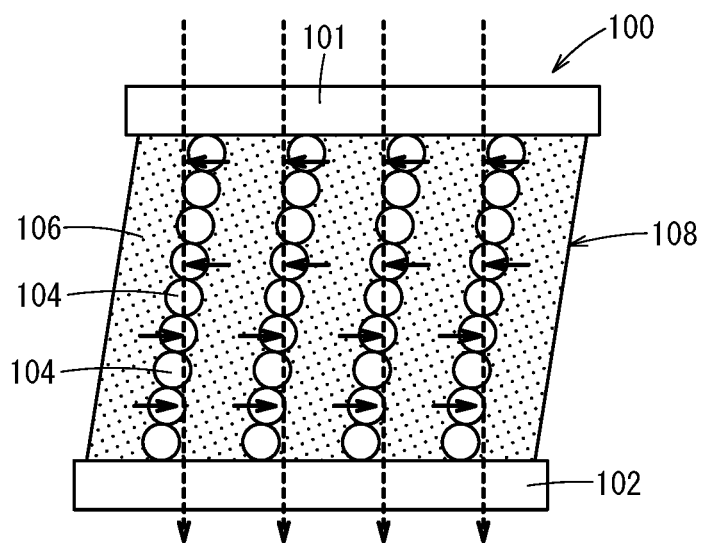
FIG. 6C is a schematic view illustrating the magnetorheological elastomer structure with the basic construction, the resilience being increased by a magnetic field applied in the vertical direction.

FIGS. 6A to 6C are schematic views illustrating the operational effects of the magnetorheological elastomer structure 100.

FIG. 6A illustrates the MRE structure 100 while no external force (shear stress) is applied in the shear direction.

In the MRE structure 100 in FIG. 6A, an MRE 108, composed of a cured elastic body 106 such as silicone rubber including vertically oriented magnetic particles such as iron powder 104, is disposed between an upper support 101 and a lower support 102.

As illustrated in FIG. 6B, when an external force in the shear direction is applied to the upper support 101 while, for example, the lower support 102 is secured to a base (not illustrate), the MRE 108 is warped laterally, that is, in the shear direction along which the external force is applied. In this case, resilience causing the elastic body 106 to return to its original shape against the external force in the shear direction occurs in the elastic body 106.

As illustrated in FIG. 6C, a magnetic field (magnetic flux) as indicated by vertical broken line arrows applied at this time increases the resilience in directions indicated by short arrows, causing the iron powder 104 to return to positions along the direction of the magnetic flux.

The resilience indicated by the short arrows in the right-to-left direction increases in the upper portion of the MRE structure 100, and the resilience indicated by the short arrows in the left-to-right direction increases in the lower portion of the MRE structure 100. The resilience increases with the magnitude of the magnetic field. In this manner, the resilience of the MRE structure 100 against the external force in the shear direction can be changed (varied) according to the magnitude of the magnetic field to be applied.

[Description of Operational Effects of Mount 18 for Subframe According to Embodiment]

Next, the operational effects of the mounts 18 for the subframe according to this embodiment, disposed on the subframe 16 at positions where the subframe 16 is supported by the vehicle body (main frame) 12 and to which the upper MRE 60 and the lower MRE 62 are applied as illustrated in FIG. 2, will be described.

As described above, the component 14 mounted on the subframe 16 includes an internal combustion engine, a differential gear, an electric motor, a fuel tank, and the like. The subframe 16 has mounting points (fastening positions) for a suspension system in addition to the component 14, and is joined to the vehicle body (main frame) 12 via the mounts 18.

Figure 7:
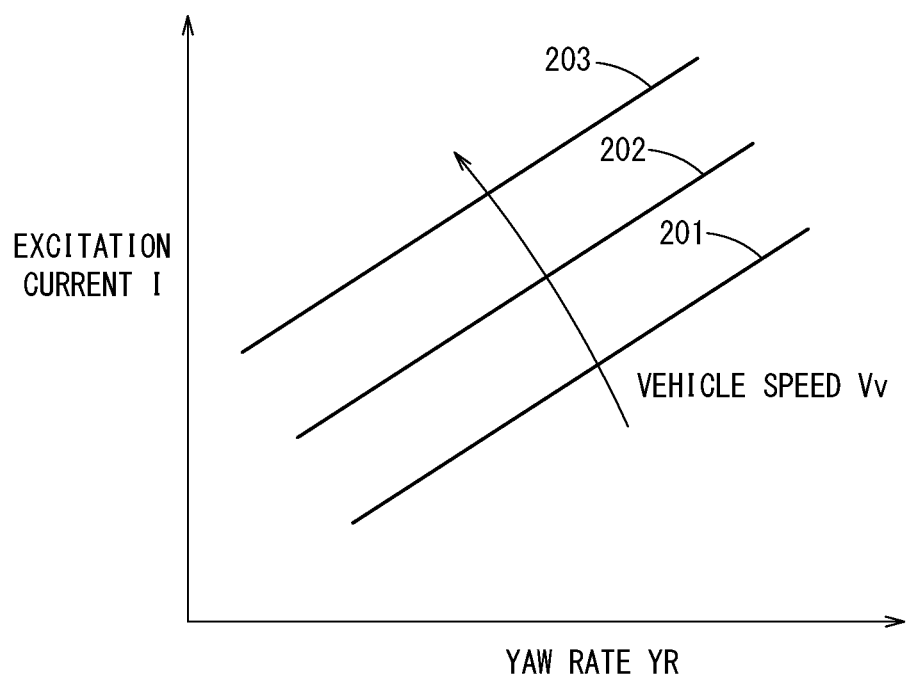
FIG. 7 is a characteristic diagram illustrating the value of coil excitation current with respect to the yaw rate and the vehicle speed.

As illustrated by example maps (characteristics) 201, 202, and 203 in FIG. 7, the ECU 24 controls the coil excitation current I of the exciting coil 50 such that the coil excitation current I increases as the yaw rate YR obtained by the yaw rate sensor 26 increases and as the vehicle speed Vv obtained by the vehicle speed sensor 28 increases to increase the resilience of the mounts 18, that is, to increase (change) the modulus of elasticity of the mounts 18.

Thus, for example, the ECU 24 sets the coil excitation current I to zero or a small value to reduce the modulus of elasticity of the mounts 18 during traveling on a straight road or cruising on a freeway to prevent input of forced vibration from the internal combustion engine or the electric motor or input of vibration transmitted from the road surface to the vehicle body (main frame) 12 via the suspension. As a result, noise and vibration felt by occupants in the vehicle cabin are reduced and thus occupant comfort is improved.

On the other hand, the ECU 24 increases the coil excitation current I to harden (change the resilience of) the mounts 18 on a curve or a winding road. This improves the dynamic performance (turning performance) of the vehicle 10 and thus improves the controllability (handling performance) by the driver.

Figure 8:
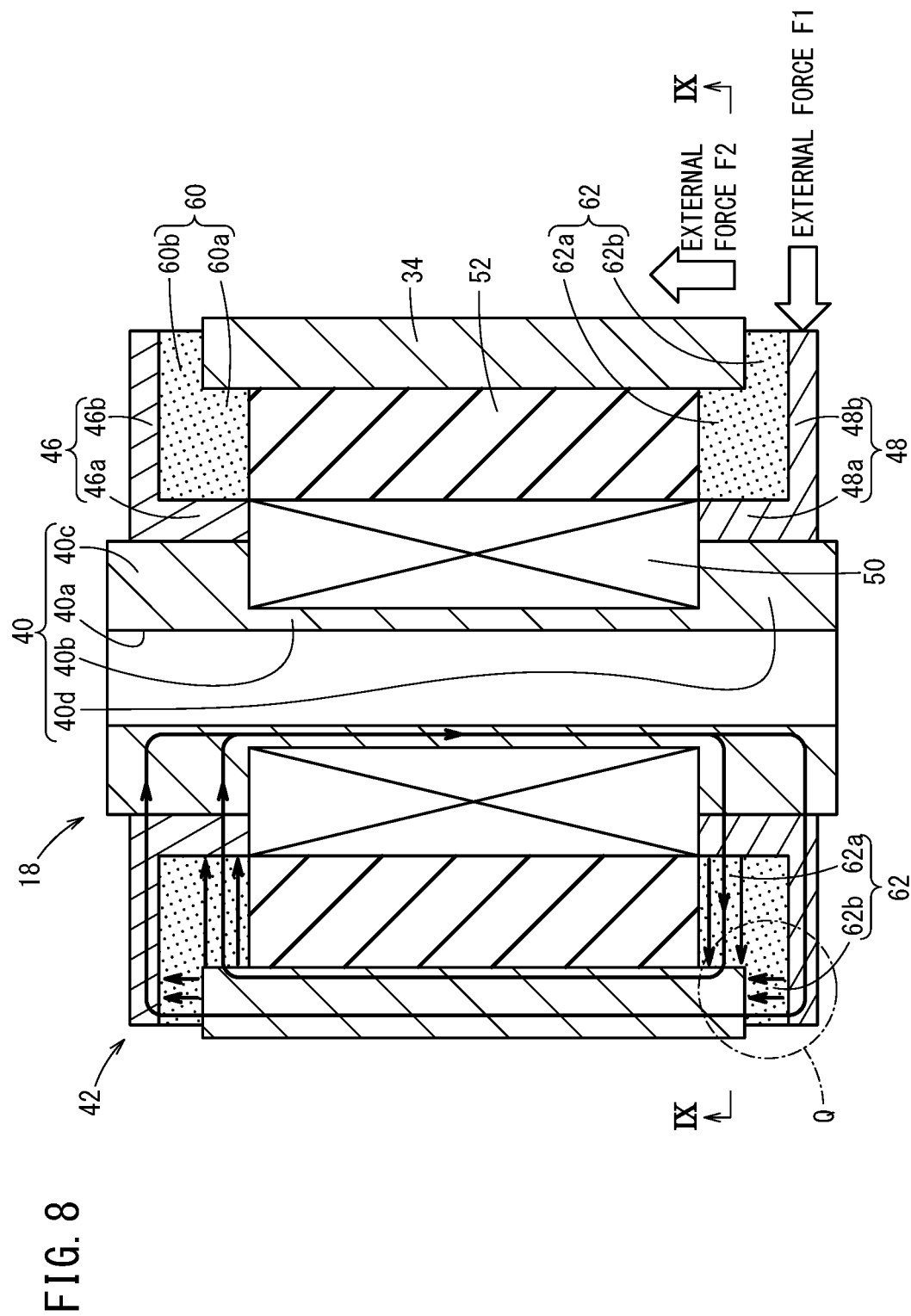
FIG. 8 is a diagram illustrating a magnetic field generated when an external force in the axial direction and an external force in the shear direction are applied to the mount according to the embodiment.

FIG. 8 illustrates the structure of the mount 18 and a magnetic field (magnetic flux), schematically illustrated by arrows, generated by applying the coil excitation current I to the exciting coil 50 when an external force F2 in the axial direction (vertical direction) and an external force F1 in the shear direction (longitudinal and transverse directions of the vehicle) are applied to (the outer cylinder 34 of) the mount 18.

In the lower brim-shaped MRE portion 62b in a corner part Q encircled by alternate long and short dash lines in the drawing, when the inner cylinder 40 fastened and secured to the vehicle body (main frame) 12 and the outer cylinder 34 secured to the subframe 16 (FIG. 2) are warped by the external force F1 in the longitudinal and transverse directions, a force causing the magnetic particles to return to positions along a direction of the magnetic flux (vertical direction, that is, axial direction) occurs in the lower brim-shaped MRE portion 62b. This enables the elastic force in the longitudinal and transverse directions to be changed.

On the other hand, in FIG. 9 illustrating the cross-section taken along line IX-IX in FIG. 8, when the inner cylinder 40 fastened and secured to the vehicle body (main frame) 12 and the outer cylinder 34 secured to the subframe 16 are warped by the external force F2 in the vertical direction, a force causing the magnetic particles to return to positions along directions of the magnetic flux (directions perpendicular to the axis; hereinafter also referred to as "axis-perpendicular directions") occurs in the upper cylindrical MRE portion 62a. This enables the elastic force in the vertical direction (axial direction) to be changed.

[Modification]

FIG. 10A is a perspective view of a mount 18A according to a modification, and FIG. 10B is a longitudinal sectional view of the mount 18A according to the modification.

Note that components of the mount 18A according to the modification corresponding to the components of the mount 18 according to the embodiment will be denoted by the identical reference signs to which "A" is added, and detailed descriptions thereof will be omitted.

In the mount 18A, a cylindrical steel collar 41 is coaxially disposed within an inner cylinder 40A composed of a magnetic body (FIG. 10B) to reinforce the inner cylinder 40A.

An exciting coil 50A is wound around the outer side of an outer cylinder 34A composed of a magnetic body.

A mount rubber 52A, an upper MRE 60A, and a lower MRE 62A are stored between the outer wall of the inner cylinder 40A and the inner wall of the outer cylinder 34A.

In the mount 18A structured as above, as in the mount 18, the coil excitation current I applied to the exciting coil 50A generates a magnetic flux in the vertical direction and radially in the longitudinal and transverse directions as indicated by arrows. This enables the elastic force in the longitudinal and transverse directions and in the vertical direction to be changed.

[Conclusion]

As described above, the mounts 18 for the subframe according to the above-described embodiment are disposed on the subframe 16 at positions where the subframe 16 is supported by the vehicle body 12.

The mounts 18 each includes the inner cylinder 40 composed of a magnetic body having a hollow shaft portion for fastening the mount to the vehicle body 12, the outer cylinder 34 composed of a magnetic body coaxially disposed on the radially outer side of the inner cylinder 40, the upper MRE 60 and the lower MRE 62 as magnetorheological elastomers disposed between the inner cylinder 40 and the outer cylinder 34, and the exciting coil 50 serving as a coil applying a magnetic field causing the viscoelasticity of the upper MRE 60 and the lower MRE 62 as the magnetorheological elastomers to be changed.

The MREs 60, 62 as the magnetorheological elastomers are composed of a plurality of magnetorheological elastomers including magnetic particles such as the iron powder 104 arranged in different manners. In other words, the upper MRE 60 includes the brim-shaped MRE portion 60b and the cylindrical MRE portion 60a, and the lower MRE 62 includes the cylindrical MRE portion 62a and the brim-shaped MRE portion 62b.

When forces are input to the mount 18 in a plurality of directions (in the axis-perpendicular directions, that is, in the shear direction, and in the axial direction in the above-described embodiment), the ECU 24 changes the magnitude of the coil excitation current I to change the strength of the magnetic field. At this moment, the elastic force (resilience) of the mount 18 can be changed in directions in response to the plurality of directions in which the forces are input, using the plurality of magnetorheological elastomers (the brim-shaped MRE portion 60b and the cylindrical MRE portion 60a and the cylindrical MRE portion 62a and the brim-shaped MRE portion 62b) including the magnetic particles arranged in different manners.

In this case, the plurality of magnetorheological elastomers include, for example, at least the brim-shaped MRE portion 60b serving as the first magnetorheological elastomer and the cylindrical MRE portion 60a serving as the second magnetorheological elastomer. The magnetic particles in the brim-shaped MRE portion 60b serving as the first magnetorheological elastomer are arranged parallel to the axial direction of the inner cylinder 40 (see the lower left drawing in FIG. 4), and the magnetic particles in the cylindrical MRE portion 60a serving as the second magnetorheological elastomer are radially arranged from the central axis in the axis-perpendicular directions of the inner cylinder 40 (see the lower right drawing in FIG. 4).

In this manner, the elastic force of the mount 18 can be changed according to the forces input to the mount 18 in the axial direction and in the axis-perpendicular directions using the brim-shaped MRE portion 60b and the cylindrical MRE portion 60a respectively serving as the first and second magnetorheological elastomers.

In this case, since the mount rubber 52 serving as a cylindrical elastic body is disposed between the inner cylinder 40 and the outer cylinder 34 in the mount 18, the cylindrical mount rubber 52 and the MREs 60, 62 as the magnetorheological elastomers can form the mass (mass member) of the elastic body of the mount 18.

In addition, the MREs 60, 62 as the magnetorheological elastomers according to this embodiment respectively include the brim-shaped MRE portions 60b, 62b serving as the first cylindrical portions composed of the magnetorheological elastomer including magnetic particles such as the iron powder 104 arranged in the axial direction and the cylindrical MRE portions 60a, 62a serving as the second cylindrical portions composed of the magnetorheological elastomer including magnetic particles such as the iron powder 104 radially arranged in the axis-perpendicular directions. The cylindrical MRE portions 60a, 62a have a diameter different from, for example, smaller than the diameter of the brim-shaped MRE portions 60b, 62b, and are respectively disposed on top of the brim-shaped MRE portions 60b, 62b on a common hollow shaft to form, for example, a flange shape.

This structure enables the elastic force of the upper MRE 60 or the lower MRE 62 as the single magnetorheological elastomer to be changed in both the axial direction and in the axis-perpendicular directions.

Moreover, in a case where the upper MRE 60 or the lower MRE 62 as the single magnetorheological elastomer is formed into a flange shape by respectively disposing the brim-shaped MRE portion 60b or 62b serving as the first cylindrical portion and the cylindrical MRE portion 60a or 62a serving as the second cylindrical portion on top of each other on the common hollow shaft, the variable elastic property in radial directions with respect to the axis becomes uniform, resulting in an improvement in convenience as a magnetorheological elastomer unit.

The present invention is not limited to the above-described embodiment, and may adopt various structures based on the description of the specification as a matter of course.

What is claimed is:

1. A mount for a subframe disposed on the subframe at a position where the subframe is supported by a vehicle body, the mount comprising:
    an inner cylinder composed of a magnetic body having a hollow shaft portion for fastening the mount to the vehicle body;
    an outer cylinder composed of a magnetic body coaxially disposed on a radially outer side of the inner cylinder;
    a magnetorheological elastomer disposed between the inner cylinder and the outer cylinder; and
    a coil configured to apply a magnetic field to the magnetorheological elastomer to change viscoelasticity of the magnetorheological elastomer;
    wherein the magnetorheological elastomer comprises a plurality of the magnetorheological elastomers including magnetic particles arranged in different manners,
    the plurality of the magnetorheological elastomers include at least a first magnetorheological elastomer and a second magnetorheological elastomer;
    the magnetic particles in the first magnetorheological elastomer are arranged parallel to a direction of an axis of the inner cylinder; and
    the magnetic particles in the second magnetorheological elastomer are radially arranged from a central axis of the inner cylinder in directions perpendicular to the axis.

2. The mount for the subframe according to claim 1, further comprising:
    an elastic body having a cylindrical shape disposed between the inner cylinder and the outer cylinder.

3. A magnetorheological elastomer unit comprising:
    a first cylindrical portion composed of a magnetorheological elastomer in which magnetic particles are arranged in a direction of an axis of the first cylindrical portion; and
    a second cylindrical portion having a diameter different from the diameter of the first cylindrical portion and composed of a magnetorheological elastomer in which magnetic particles are radially arranged in directions perpendicular to an axis of the second cylindrical portion;

wherein the first cylindrical portion and the second cylindrical portion are disposed on top of each other on a common hollow shaft.

4. The magnetorheological elastomer unit according to claim 3, wherein:

the second cylindrical portion has a diameter smaller than the diameter of the first cylindrical portion; and the first cylindrical portion and the second cylindrical portion disposed on top of each other on the common hollow shaft form a flange shape.

* * * * *